United States Patent [19]

Gale et al.

[11] Patent Number: 5,000,824

[45] Date of Patent: Mar. 19, 1991

[54] POLYETHYLENE PULP

[75] Inventors: David M. Gale, Wilmington, Del.; Robert G. Joseph, Midlothian, Va.

[73] Assignee: E. I. du Pont de Nemours and Company, Wilmington, Del.

[21] Appl. No.: 52,034

[22] Filed: May 19, 1987

[51] Int. Cl.$^5$ .................... D21F 11/00; B28B 1/26
[52] U.S. Cl. ................ 162/157.5; 162/157.4; 264/13; 264/14
[58] Field of Search ............ 162/157.2, 157.1, 157.3, 162/157.4, 157.5; 264/13, 14

[56] References Cited

U.S. PATENT DOCUMENTS

| | | |
|---|---|---|
| 2,999,788 | 9/1961 | Morgan . |
| 3,808,091 | 4/1974 | Aoki et al. ............... 162/157.5 |
| 3,878,183 | 4/1975 | Koga et al. .............. 162/157.5 X |
| 3,891,499 | 6/1975 | Kato et al. ............... 162/157.5 |
| 3,902,957 | 9/1975 | Kozlowski ............... 162/157 R |
| 3,920,507 | 11/1975 | Yonemori ................ 162/157.5 |
| 3,920,509 | 3/1975 | Yonemori ................ 162/157 R |
| 3,957,573 | 5/1976 | Miyamoto et al. ....... 162/157.5 X |
| 4,107,243 | 8/1978 | Stearns et al. ............ 162/157.5 X |
| 4,310,591 | 1/1982 | Lee et al. ................. 162/157.5 X |
| 4,404,314 | 9/1983 | Jabloner .................. 524/519 |
| 4,608,089 | 8/1986 | Gale et al. . |

FOREIGN PATENT DOCUMENTS 2378728 8/1978 France .
891945 3/1962 United Kingdom .

OTHER PUBLICATIONS

JPX 60 141 659 Mitsui Petrochemical Industries Ltd.
Tappi vol. 59, No. 5, May 1976 pp. 113-116; W. A. Kindler: "The Influence of Synthetic Pulp Fibers on Web Behavior".
Kirk-Othmer: Encyclopedia of Chemical Technology, v. 19, 3rd Ed., John Wiley & Sons (1982), pp. 420-435.
Kirk-Othmer: Encyclopedia of Chemical Technology, vol. 19, 3rd Ed., John Wiley & Sons (1982), pp. 420-435.

Primary Examiner—David A. Simmons
Assistant Examiner—Thi Dang

[57] ABSTRACT

An improved pulp of oriented polyethylene fibrids is provided. The pulps have fibrids which average no longer than 1.2 mm, have a drainage factor of at least 2.5 sec/g, are capable of forming wet-laid sheets of uniform opacity and preferably have an agglomeration number of less than 2. The pulps are particularly useful as synthetic papers, in reinforced cement articles, in reinforced resin articles and in reinforced gaskets.

13 Claims, No Drawings ced polyethylene fibrids into an aqueous slurry of
POLYETHYLENE PULP

BACKGROUND OF THE INVENTION

1. Field of the Invention

This invention concerns an improved synthetic pulp of oriented polyethylene fibrids, suited particularly for use in asbestos-reinforced articles as a replacement for the asbestos. The invention also concerns a process for preparing the pulp and articles reinforced with the pulp.

2. Description of the Prior Art

Pulps from synthetic organic polymers have been described by Morgan, U.S. Pat. No. 2,999,788. Synthetic polyolefin pulps are made commercially, as described, for example, by Kirk-Othmer: Encyclopedia of Chemical Technology, vol. 19, 3rd edition, p. 420-435 (1982). However, such pulps generally do not function well as reinforcing fibers.

Pulps of oriented polyethylene fibrids are disclosed in British Patent 891,945. Gale et al, U.S. Pat. No. 4,608,089, discloses incorporating such a pulp of oriented polyethylene fibrids into an aqueous slurry of Portland cement for making fiber-reinforced cement articles. The pulp is prepared from flash-spun plexifilaments which are cut into small pieces and beaten in an aqueous medium. In pulp-reinforced cement composites, the pulp constitutes from 0.1 to 10% of the weight of the dried and cured composite. Although these pulps have found some utility in such cement composites, improvements in these pulps could enhance their utility considerably in reinforced cements as well as expand their use into other end-uses.

SUMMARY OF THE INVENTION

This invention provides an improved pulp of oriented polyethylene fibrids, a process for making the pulp and particular articles in which the improved pulp is incorporated. The fibrids are of the type that can be prepared from flash-spun, oriented, linear polyethylene, plexifilamentary strand that was converted into small fibrous pieces. According to the present invention, the improvement comprises the fibrids having an average length of no greater than 1.2 mm, preferably in the range of 0.5 to 1.0 mm, and the pulp having a drainage factor of at least 2.5 seconds per gram, preferably at least 3 sec/g, and being able to form a waterleaf that, when dried, at a unit weight of 34 g/m$^2$, has an opacity of at least 75%, preferably at least 80%, with a variance of no greater than 8, preferably no greater than 5. Preferably, the pulp has an agglomeration number of no more than 2, most preferably of no more than 1. It is also preferred that the polyethylene fibrids have a birefringence of at least 0.035, most preferably of at least 0.037.

The process for preparing the improved oriented polyethylene pulp of the invention involves some of the same steps as are used in preparing the pulps of Gale et al. The common steps include flash-spinning a linear polyethylene polymer into strands of oriented film fibrils and converting the strands into small pieces that are then reduced in size by refining in an aqueous medium to form a fibrous pulp slurry. The improvement of the process of the present invention comprises further refining the fibrous pulp slurry until an average fibrid length of no greater than 1.2 mm, preferably of no greater than 1.0 mm, is achieved and no more than 25%, preferably no more than 10%, of the fibrous pulp is retained on a 14-mesh screen and at 50% preferably at least 60% of the pulp passes through the 14-mesh screen but is retained by a 100-mesh screen, all mesh sizes being in accordance with Bauer-McNett Classification Sizes.

The present invention also includes articles made with the above-described refined pulp, particularly specialty synthetic pulp papers, reinforced gaskets, and articles of reinforced cement or of reinforced resin. A heat-bonded sheet of pulp of the invention is particularly useful for filtration applications.

DETAILED DESCRIPTION OF PREFERRED EMBODIMENTS

The pulps of the present invention represent an improvement over the oriented polyethylene fibrid pulps known in the art. For example, Gale et al, U.S. Pat. No. 4,608,089, discloses cement matrix composites prepared with such pulps as reinforcement. The differences between the pulps of the invention and those of Gale et al can be readily seen from the comparisons given below in the Examples. The pulps of the present invention, as compared to those of Gale et al, have smaller fibrids, have longer drainage times, contain fewer agglomerates and are capable of forming more uniform, less splotchy sheets. Surprisingly, articles made with pulps of the invention are stronger than are articles reinforced with similar pulps having longer fibrids; in the art longer fibers generally were considered to provide stronger reinforcement.

In accordance with the present invention, the preferred process for making the oriented polyethylene pulps includes certain steps known in the art. For example, Gale et al discloses forming a fibrous pulp of oriented polyethylene fibrids by the steps of (a) flashspinning linear polyethylene into interconnected strands of oriented polyethylene film-fibrils, (b) converting the strands into small pieces and (c) reducing the size of the pieces in an aqueous slurry pulp refiner. In the process of the present invention, the size reduction step is continued beyond that attained in Gale et al. Equipment suitable for the further refining is described in the Examples below.

The additional refining required for pulps of the invention is continued until a specific range of sizes of the oriented polyethylene fibrids is obtained. The resultant fibrids are characterized by an average length of no greater than 1.2 mm, preferably of no greater than 1.0 mm, and in a range of sizes such that no more than 25%, preferably no more than 10%, of the pulp fibrids are retained on a 14-mesh screen and at least 50%, preferably at least 60%, of the fibrids pass the 14-mesh screen but are retained on a 100-mesh screen, all screen sizes being in accordance with Bauer-McNett Classification Screen sizes.

The term "oriented" when referring herein to polyethylene fibrids means that the polyethylene has a birefringence at least 0.030. Preferably, the birefringence of the polyethylene of the pulps of the invention is at least 0.035, and most preferably at least 0.037.

The various characteristics referred to herein for the pulps and products made with them are measured by the following methods. In the descriptions of the methods, ASTM refers to the American Society of Testing Materials, TAPPI refers to the Technical Association of Paper and Pulp Industry and ISO refers to the International Organization for Standardization.

The average length of the polyethylene fibrids and the statistical variance (i.e., the square of the standard deviation) of that average are measured conveniently as follows. A sample of aqueous slurry of the pulp is diluted to 1.8 milligrams of dry pulp per liter. A kitchen juicer (e.g., Krupf Model 215 juicer) is employed to prepare the fibrids for length measurement. A black felt cloth is placed at the bottom of the juicer barrel. The juicer barrel is rotated and about 200 ml of well-mixed, diluted slurry is passed poured slowly, somewhat offset from the axis or rotation of the barrel, onto the black cloth at the bottom of the rotating barrel. The water of the slurry exits radially through holes in the cylindrical wall of the barrel. The centrifugal motion of the rotation causes the fibrids of the slurry align themselves radially as they are deposited on the black felt cloth. The cloth with the deposited fibrids is partially dried and random areas of the cloth are then photographed, at a magnification of about 10×. At least eight such photographs are made for each pulp. The lengths of the fibrids in the photographs are then measured. A sufficient number of fibrid lengths are measured, usually between 300 and 500, to assure a statistically valid value for average and its variance. For convenience, a light pen attached to a digitizer board of a computer can be used (as was done for the Examples below) to assist with the data recording and statistical calculations.

Drainage factor is given in seconds per gram and is measured in accordance with TAPPI T221-OS63, as described in Koslowski et al, U.S. Pat. No. 4,054,625, column 10, lines 39 through 68.

Agglomeration number is a measure of the uniformity of the pulp and is measured as follows. A sample of aqueous slurry of the pulp is mixed and diluted to a concentration of 3 grams of dry pulp per liter. While being mixed, three drops of a surfactant ("Aromox" DM-16 sold by Armak of Mc Cook, Ill.) are added to maintain the dispersion. A 0.07-ml sample of the thusly prepared slurry is withdrawn with a micro eye-dropper and deposited on a microscope slide, covered with a slide cover glass and allowed to dry at room temperature. At least eight such slides are made for each pulp. After drying, the cover glass is removed and one drop of deionized water is added to each slide and a fresh cover glass is applied. Excess water and any air bubbles are removed from the sample by pressing gently on the slide cover. The thusly slide samples are then photographed with a black field at 10× magnification. The developed photo frame measures 118 by 89.5 mm so that all of the pulp on the slide is included in the photograph. Agglommerated and entangled fibrids appear as white areas on the photograph. The number of solid white areas that measure at least 2 mm in diameter on each photo is counted. A solid white area that is irregular in shape is counted if it can enclose a circle of 2-mm diameter. If a solid white area is large enough to contain more than one 2-mm diameter circle, then the number of such circles that the area can enclose is counted. The sum of all the thusly counted white areas on all the slides, divided by the number of slides, is the agglomeration number.

Birefringence is measured by the technique given in detail in Gale et al, U.S. Pat. No. 4,608,089, column 2, line 64 through column 3, line 33, which specific disclosure is incorporated herein by reference.

Bauer-McNett values are measured in accordance with TAPPI T33 0S75.

Dried handsheets of the pulp, sometimes referred to herein as "waterleafs", are prepared with a 8-by-8-inch (20.3-by-20.3-cm) Noble and Wood Handsheet Mold and thermal dewatering. Sheet unit weight is measured in accordance with ASTM D 3776-79 and is reported in grams per square meter. Sheet tensile strength is measured on a specimen measuring 1-inch (2.54-cm) wide by 8-inches (20.3-cm) long with a Constant Rate of Extension Instron Tester operated at a crosshead speed of 2.0 inches per minute (5.08 cm/min) and a gage length of 5.0 inches (12.7 cm).

Opacity of a dried water-laid handsheet is measured with a Technidyne Micro TB1C testing instrument (manufactured by Technidyne Corporation of New Albany, Ind.) which conforms with ISO Standards 2469 and 2471 and TAPPI T519 for measurements of diffuse opacity. The determinations are made in accordance with procedures published by Technidyne, "Measurement and Control of the Optical Properties of Paper" (1983) and in particular employ diffuse geometry with a Position B filter which has a 457-nm effective wavelength. The determinations are analyzed statistically to provide the average opacity and its variance for sheets of a given pulp. A small variance of opacity indicates the ability of a pulp to form uniform, non-blotchy synthetic pulp sheet.

Frazier air permeability is measured in accordance with ASTM D 737-46 and is reported in cubic meters per square meter per hour (or in meters/min).

Flexural toughness and flexural strength of a cement composite are measured in accordance with ASTM D-790, as described in Gale et al, U.S. Pat. No. 4,608,089, on samples prepared as described in column 3, line 34, through column 4, line 13, which disclosure is incorporated herein by reference.

Gasket tensile strength is measured in accordance with ASTM D 412.

In the Examples which follow, all percentages and ratios of composition ingredients are by total weight of the composition, unless indicated otherwise.

EXAMPLES 1 and 2

Two oriented polyethylene pulps of the invention are compared in these examples with (a) a similar pulp of Gale et al, U.S. Patent No. 4,608,089, and with (b) two similar pulps, designated Comparisons A and B, which are outside the present invention but are closer to the pulps of the invention in fibrid length, length variance and agglomeration number than is the prior-art pulp of Gale et al. The advantages of the shorter, more uniform fibrids of the pulps of the invention over the prior art and comparison pulps is demonstrated in pulp-reinforced cement articles and in synthetic pulp sheets.

The starting material for the preparation of each polyethylene pulp was substantially as described in Gale et al, U.S. Pat. No. 4,608,089, column 1, line 53 through column 2, line 19, which disclosure is incorporated herein by reference. In brief, a solution of linear polyethylene in trichlorfluoromethane was flash spun into plexifilamentary strands of oriented film fibrils; the strands were formed into a sheet; the sheet was lightly consolidated and cut into small pieces in preparation for refining as a low concentration aqueous slurry.

For the prior-art pulp, the starting sheet was slit into 1 to 5 inch (2.5 to 13 cm) wide strips which were then chopped into 4-to-12 inch (10 to 31 cm) pieces. The pieces were mixed with water to form a slurry of 2 % solids content. A dispersion enhancer, amounting to 2% by weight of the solids, was added to the slurry. The enhancer was a 20:1 mixture of polyvinyl alcohol and Triton X-100 surfactant (sold by Rohm & Haas). The slurry was then treated in three passes through Model 36-2 Disc Refiners (sold by Sprout Waldron Company of Muncey, Pennsylvania) which were operated at 1800 rotations/min. The refiners were equipped with Model 16808 A,B main plates and Model 17709 peripheral control rings. For the first pass, nominal clearance was 0.010 inch (0.25 mm) between the main plates and 0.003 inch (0.075 mm) between the peripheral control rings. For the last pass, the slurry was diluted to 1% solids. Feed rates to the first, second and third passes, based on dry weight of pulp, were respectively 3, 8 and 7 pounds per minute (1.4, 3.6 and 3.2 kg/min). The refined pulp was dewatered on a 150 mesh screen and then dried.

For the Example 1 and 2 pulps of the invention and the Comparison Pulps A and B, a 40.7-g/m² starting sheet was cut into small pieces with a Sprout Waldron Granulator Model DSF-1512 which was equipped with an outlet sieve that had 1.5-inch (3.8-cm) diameter holes. The cut pieces were mixed with water to form a 2% slurry to which the above-described dispersion enhancer was added at a concentration, based on dry pulp weight, of 3% for Example 1 and 4% each for Example 2 and Comparisons A and B. The slurry was then refined in two passes through Sprout-Waldron Disc Refiners. In the first pass, the refiner, a Model 36-1 C, was equipped with Model D1A150 main plates. Feed rates in the first pass were 10 lb/min (4.5 kg/min) for Example 1, 3 lb/min (1.4 kg/min) for Example 2 and 4 lb/min (1.8 kg/min) for each of the Comparisons. In the second pass, the refiner, a Model 36-2, was equipped with Model 18042A main plates. Neither of the refining passes employed peripheral control rings. Each refiner was operated at 1800 rpm. Nominal main plate clearance in the first pass was about 0.010 inch (0.25 mm) for the comparison pulps; 0.001 inch (0.025 mm) for pulp of Example 2; and a nominal interference fit for the pulp of Example 1. For the second refining pass, the solids concentration of the pulps was reduced to 1% except for Example 1, wherein the concentration remained at 2%. Nominal plate clearance for all pulps in the second refining pass was between about 0.001 and 0.002 inch (0.25–0.5 mm). Pulps of Example 2, Comparison A and Comparison B were dewatered and dried as described above for the prior-art pulp. Prior to dewatering and drying, the Example 1 pulp was passed through a Centrisorter Screen Model 100 (sold by Bird Machine Company) equipped with an outlet plate having 0.087-inch (2.2-mm) diameter holes. The following table summarizes characteristics of the resultant pulps and some articles made therewith.

| | Test Pulps | | | | |
|---|---|---|---|---|---|
| | Examples | | Comparisons | | Prior |
| | 1 | 2 | A | B | Art |
| Fibrid Length | | | | | |
| Average, mm | 0.82 | 0.85 | 1.25 | 1.10 | >2.4 |
| Variance | 1.10 | 1.55 | 1.97 | 1.6 | >2.4 |
| Pulp Screening, % | | | | | |
| Retained on 14 mesh | 7.8 | 20** | 56.7 | 40.7 | 38.4 |
| Pass 14, on 100 mesh | 66.7 | 53** | 28.9 | 41.6 | 42.5 |
| Passing 100 mesh | 25.5 | 26.4 | 14.4 | 17.7 | 19.9 |
| Agglomeration Number | 0.7 | <2. | 1.4 | 2.9 | 3.9 |
| Drainage Factor, sec/g | 3.5 | 3.5 | 2.7 | 2.3 | 1.8 |
| Birefringence | 0.038 | 0.030 | 0.034 | 0.032 | 0.032 |
| Sheet Uniformity | | | | | |
| Opacity, % | 84 | >75* | 86 | 84 | *** |
| Opacity Variance | 4.6 | <7* | 10.4 | 9.2 | *** |
| Cement Tile Properties | | | | | |
| Toughness, KJ/m² | 1.5 | 1.6 | 1.6 | 1.6 | 1.7 |
| Flex Strength, MPa | 22.0 | 21.2 | 15.0 | 18.6 | 16.5 |

*Estimated values
**These values were estimated from measurements that showed 14.2% retained on 10-mesh and 59.4% passing 10 mesh but being retained on 100 mesh.
*** means that no measurement was made.

As shown in the table, in contrast to the prior art and comparison pulps, the pulps of the invention had shorter fabrids, a narrower distribution of fibrid sizes (as indicated by the length variance values), a higher drainage factor and an ability to form more uniformly opaque sheets.

The average length of the fabrids of the pulps of Example 1 and Example 2 were respectively 0.82 and 0.85 mm; that of the prior art pulp was greater than 2.4 mm. The variance in fabric length for the pulps of Examples 1 and 2 was 1.10 and 1.55 respectively; that of the prior art pulp was greater than 2.4.

The drainage factors of Example 1 and 2 pulps of the invention were each 3.5; that of the prior art pulp was 1.8 sec/g.

Note the especially low agglomeration number for the pulps of the invention. Pulps with low agglomeration numbers produced sheets that were less splotchy and more uniform. The agglomeration number for the prior art pulp was at least twice that of the pulps of the invention and more than 5 times that of the pulp of Example 1.

Comparison of the opacity variance of sheets formed from a pulp of the invention versus the opacity variance of sheets formed from pulps outside the invention further demonstrates the advantage of the pulps of the invention in forming more uniform, non-splotchy sheets. Opacity variance for sheet made with the pulp of Example 1 was 4.6 versus 10.4 and 9.2 for Comparisons A and B, respectively.

When included in cement tiles, the pulp of the invention provided the resultant pulp-reinforced tiles with greater flexural strength than achieved by tiles reinforced with the prior art or comparison pulps. The tiles containing the pulps of Example 1 and 2 were stronger than the tiles reinforced with the prior-art pulp by 28 and 33 percent, respectively.

Pulps of Example 1 and Comparison B were incorporated as reinforcing fibers into gaskets and compared in tensile strength to gaskets having similarly incorporated commercial polyethylene synthetic pulp ("Pulpex" EA, sold by Hercules Corp. of Wilmington, Del.). The composition of the gasket material was 10% pulp, 75% talc filler and 15% Chemigum 260 latex. The composition was cured for 40 minutes at 110° C. under 2000 psig (13,780 kPa). The tensile strengths of the gaskets were:

| | |
|---|---|
| Pulp of Example 1 | 1890 psi (13,020 kPa) |
| Pulp of Comparison B | 1730 psi (11,920 kPa) |
| "Pulpex" EA | 1650 psi (11,370 kPa). |

These measurements of gasket stength again showed the advantage of the pulps of the invention. A similar advantage for pulps of the invention was observed when the pulps were used to reinforce epoxy resins intended for molded laminates.

Samples of pulps of Example 1 and Comparisons A and B were formed into waterleafs of 40.7-g/m² unit weight and then heat-bonded for 3 minutes on a steam-heated platen press operating at a temperure of 133° C. and a pressure of 362 kPa. The following tensile strengths and Frazier permeabilities were obtained.

| Sheet Pulp | Strength (N/cm) | Permeability (m/min) |
|---|---|---|
| Ex. 1 | 20.6 | 2.5 ± 0.6 |
| Comp. A | 12.8 | 4.5 ± 1.4 |
| Comp. B | 11.4 | 4.5 ± 1.2 |

The nonuniformity of comparison sheets A and B are reflected in their higher porosities and lower strengths versus those of Example 1. Holes, which were visible to the naked eye, apparently caused the higher values and larger standard deviations in the porosities of the comparison sheets. The lower sheet tensile strength also probably was due to the poorer uniformity of the Comparison sheets. Example 1 sheet was stronger, even though it was made with shorter fibrids.

A series of bonding tests with sheets made with pulp of the invention showed that sheet tensile strength and porosity both increased with higher temperature bonding. Sheets of pulps of the invention therefore are particularly suited for filtration uses. The sheets can be "tailored" to a particular desired porosity, while still retaining good strength properties, by adjustment of the thermal bonding conditions.

We claim:

1. An improved process for making a fibrous pulp of oriented polyethylene fibrids, the process including the steps of flash-spinning a linear polyethylene into strands of oriented film fibrils having a birefringence of at least 0.030 and converting the strands into small pieces that are then reduced in size by refining in an aqueous slurry to form the pulp, the improvement comprising further refining the aqueous slurry until an average fibrid length of no greater than 1.2 mm is achieved and no more than 25% of the pulp is retained on a 14-mesh screen and at least 50% of the pulp passes the 14-mesh screen but is retained on a 100-mesh screen, said further refining producing a pulp having enhanced reinforcing ability over a pulp of synthetic fibrids averaging greater than 1.2 mm in length when incorporated into a cement, a filter paper, sheets, gaskets or resinous articles.

2. An process in accordance with claim 1 wherein the refining is continued until the average fibrid length is in the range of 0.5 to 1.0 mm, no more than 10% of the pulp is retained on the 14-mesh screen and at least 60% of the pulp passes the 14-mesh screen but it retained on the 100-mesh screen.

3. A process in accordance with claim 1 or 2 wherein the initial part of the aqueous slurry refining step is performed in a disc refiner wherein the nominal clearance between the main refining plates is in the range of an interference fit to no greater than 0.05 mm.

4. An improved fibrous pulp of oriented polyethylene fibrids having a birefringence of at least 0.030, the improvement comprising the fibrids averaging no greater than 1.2 millimeters in length, the pulp having a drainage factor of at least 2.5 seconds per gram and when the pulp is wet-laid and dried to form a 34 g/m² sheet, the sheet has an opacity of at least 75% and an opacity variance of no greater than 8, said pulp having enhanced reinforcing ability over a pulp of synthetic fibrids averaging greater than 1.2 millimeters in length when incorporated into a cement, a filter paper, sheets, gaskets or resinous articles.

5. A pulp in accordance with claim 4 wherein the average fibrid length is in the range of 0.5 to 1 mm, the drainage factor is at least 3 sec/g, the opacity is at least 80% and the opacity variance is no greater than 5.

6. A pulp in accordance with claim 4 or 5 wherein the polyethylene fibrids have a birefringence of at least 0.035.

7. A pulp in accordance with claim 4 or 5 wherein the polyethylene fibrids have a birefringence of at least 0.037.

8. A pulp in accordance with claim 4 or 5, wherein the pulp has an agglomeration number of no greater than 2.

9. A pulp in accordance with claim 4 or 5, wherein the agglomeration number is no greater 1.

10. A wet-laid filter paper prepared from the pulp of claim 4 or 5.

11. A wet-laid, dried and thermally bonded sheet prepared from the pulp of claim 4 or 5.

12. A fibrous-pulp-reinforced cement article wherein the pulp is in accordance with claim 4 or 5.

13. A fibrous-pulp-reinforced resin article wherein the pulp is in accordance with claim 4 or 5.

* * * * *

UNITED STATES PATENT AND TRADEMARK OFFICE
CERTIFICATE OF CORRECTION

PATENT NO. : 5,000,824

DATED : March 19, 1991

INVENTOR(S) : David Mark Gale and Joseph Robert Guckert

It is certified that error appears in the above-identified patent and that said Letters Patent is hereby corrected as shown below:

On the title page: Item [75], the second identified inventor "Robert G. Joseph", should read --Joseph R. Guckert--.

Signed and Sealed this

Twenty-sixth Day of January, 1993

Attest:

STEPHEN G. KUNIN

*Attesting Officer*          *Acting Commissioner of Patents and Trademarks*